United States Patent
Sluyski et al.

(10) Patent No.: US 12,476,782 B2
(45) Date of Patent: Nov. 18, 2025

(54) SYSTEMS AND METHODS FOR SYNCHRONIZING NETWORK NODES

(71) Applicant: Cisco Technology, Inc., San Jose, CA (US)

(72) Inventors: Mike A. Sluyski, Maynard, MA (US); Glen W. Miller, Maynard, MA (US); Jim Duda, Maynard, MA (US); Markus Weber, Maynard, MA (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 18/367,199

(22) Filed: Sep. 12, 2023

(65) Prior Publication Data
US 2024/0106622 A1 Mar. 28, 2024

Related U.S. Application Data

(60) Provisional application No. 63/409,599, filed on Sep. 23, 2022.

(51) Int. Cl.
*H03D 3/24* (2006.01)
*H04L 7/00* (2006.01)
*H04L 7/033* (2006.01)

(52) U.S. Cl.
CPC ............ *H04L 7/0033* (2013.01); *H04L 7/033* (2013.01)

(58) Field of Classification Search
CPC ...... H04L 7/0033; H04L 7/033; H04J 3/0685; H04B 17/00; H04M 11/062
USPC .......................... 375/373, 375, 376, 356, 358
See application file for complete search history.

(56) References Cited

U.S. PATENT DOCUMENTS

| | | | |
|---|---|---|---|
| 7,023,907 B1* | 4/2006 | Olofsson | H04M 11/062 375/222 |
| 2011/0296226 A1* | 12/2011 | Sorbara | H04J 3/0685 713/400 |
| 2017/0187384 A1* | 6/2017 | Shimada | H03B 17/00 |
| 2019/0379474 A1 | 12/2019 | Coulter | |

FOREIGN PATENT DOCUMENTS

WO 2022/125769 A1 6/2022

OTHER PUBLICATIONS

Ghiasi Ali: "Published Specifications SFP-DD/SFP-DD112/SFP112 Rev. 5.0 SFP-DD MSA SFP-DD MSA SFP-DD/SFP-DD112/ SFP112 Hardware Specification SFP112 and SFP Double Density Pluggable Transceiver", Oct. 1, 2021 (Oct. 1, 2021), pp. 1-107, XP093033125, Retrieved from the Internet: U RL:http://sfp-dd.com/wp-contenVuploads/2021 /1 0/SFP-DDrev5.0-Oct1 -21.pdf [retrieved on Mar. 20, 2023] (97 pages).

(Continued)

*Primary Examiner* — Phuong Phu
(74) *Attorney, Agent, or Firm* — Patterson + Sheridan, LLP

(57) ABSTRACT

In one embodiment, the disclosure includes a network node synchronization system. The system may include a first node. The first node may include a first host card comprising a first (TOD) time of day counter, a first digital signal processor (DSP) comprising a first DSP counter; and a first optical communication device comprising a first DSP communication channel, wherein the first DSP communication channel transports DSP frames. In various embodiments, the DSP is a coherent DSP.

19 Claims, 6 Drawing Sheets

(56) References Cited

OTHER PUBLICATIONS

OIF: "Implementation Agreement 400ZR", ITU-T Draft; Study Period 2017-2020; Study Group 15, International Telecommunication Union, Geneva; Ch; vol. ties/15 Nov. 14, 2019 (Nov. 14, 2019), pp. 1-101, XP044275340, Retrieved from the Internet: URL:https://www.itu.int/ifa/t/2017/sg15/docs/200127/td/ties/gen/ T17-SG15-200127-TD-GEN-0330 !! ZIP-E.zip oif2017.245.14.pdf [retrieved on Nov. 14, 2019] (101 pages).
Extended European Search Report for European Application No. 23197749.7-1213 dated Feb. 12, 2024 (12 pages).

* cited by examiner

SYSTEMS AND METHODS FOR SYNCHRONIZING NETWORK NODES

CROSS REFERENCE TO RELATED APPLICATIONS

This application claims priority to and the benefit of U.S. Provisional Patent Application No. 63/409,599 filed Sep. 23, 2022, the entire disclosure of which is incorporated by reference herein.

FIELD

This disclosure relates generally to the field of digital signal processing and synchronizing devices.

BACKGROUND

Contemporary telecommunications systems make extensive use of digital signal processing methods and devices that are advantageously mass-produced in various configurations for various purposes.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DESCRIPTION OF EXAMPLE EMBODIMENTS

Overview

Figure 1:
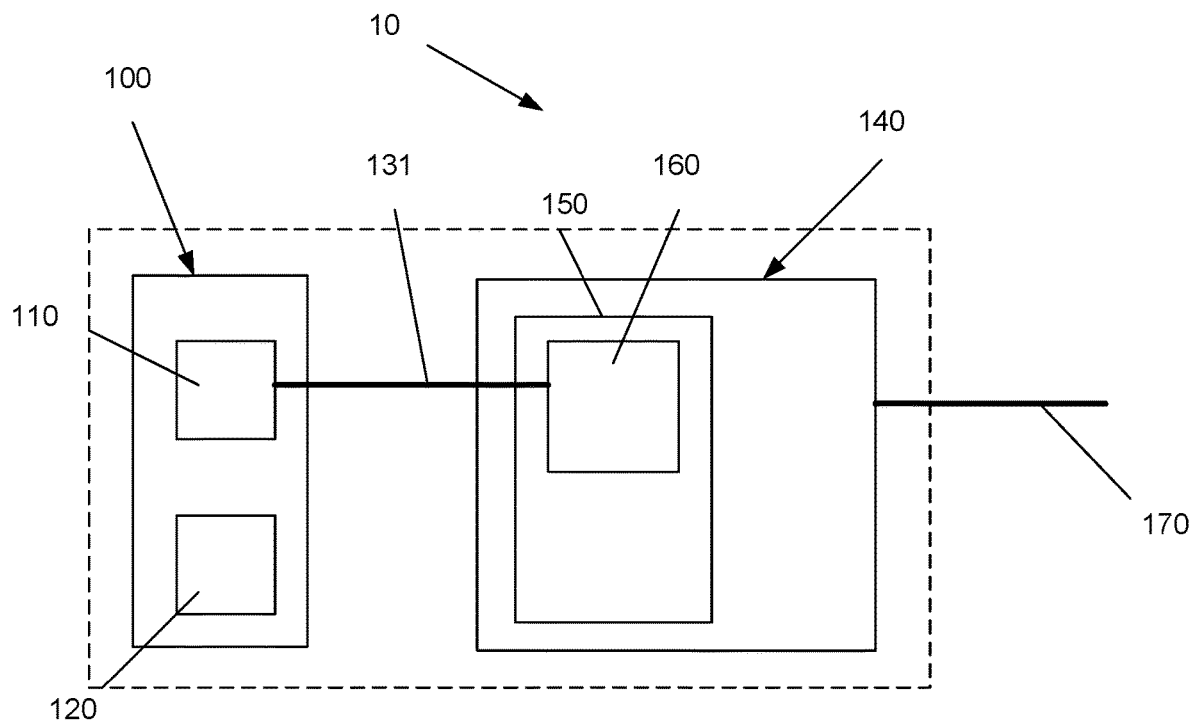
FIG. 1 is a schematic diagram of a network node that includes a host TOD counter and a DSP TOD counter for a communication module according to an exemplary embodiment of the disclosure.

In part, in one aspect, the disclosure relates to a network node synchronization system. The system may include a first node that may include a first host card that includes a first (TOD) time of day counter, a first digital signal processor (DSP) comprising a first DSP counter; and a first optical communication device that includes a first DSP communication channel, wherein the first DSP communication channel transports DSP frames. In some embodiments, the DSP is a coherent DSP. In various embodiments, the first host card comprises a first embedded Pulse Per Second (ePPS) counter. In many embodiments, the first DSP counter is synchronized to the first TOD counter in the first node.

In part, in another aspect, the disclosure relates to a method to synchronize a first network node and a second network node. The method may include providing a first node comprising a first host TOD counter in communication comprising a first coherent DSP in the first node running a first DSP TOD counter; providing a second node comprising a second host TOD counter in communication comprising a second coherent DSP in the second node running a second DSP TOD counter; synchronizing the first DSP TOD counter with the first host TOD counter; and transmitting a first DSP message from the first DSP to the second DSP via a communication channel, wherein the first DSP message comprises a non-zero status value.

EXAMPLE EMBODIMENTS

In part, the disclosure relates to the synchronization of clocks/counters between a master node and at least one secondary node in a network using a protocol including a time of day (TOD) counter implemented in a digital signal processor (DSP) and a communication back-channel. In some embodiments, the frequency and phase of a known TOD counter in a master node is first transferred to a TOD counter internal to a DSP in a coherent module within the master node. The master DSP TOD is broadcast or otherwise transmitted to the DSP in the coherent module of a secondary node using a back-channel in a transmitted DSP message. In some embodiments, the DSP is a coherent DSP. In various embodiments, a master node or primary node and a secondary node are synchronized using an out of band or auxiliary communication channel that manages or adjust for latency or delays using deterministic signaling. In some embodiments, the out of band or auxiliary communication channel is between a first DSP and a second DSP. Various network lines may be used as one or more out of band network lines. In some embodiments, Ethernet communications and/or optical transport networking and other communication protocols may be used without limitations for various data communications such a DSP communication channels. In addition, the various counters, DSPs, communication channels, and other components described herein may be described using various identifiers such as first, second, third, fourth, fifth, etc., without limitation.

In general, time synchronization among networked devices is important for modern high throughput data networks. Various protocols for time synchronization have been developed. For example, a Precision Time Protocol (PTP) is one type of protocol network synchronization between devices. Other synchronization protocols may be used such as NTP, or Network Time Protocol, a GPS information-based protocol, general PTP (gPTP), and others. In various embodiments, the disclosure relates to systems and method to synchronize a first node and a second node relative to a counter and such that the signals are synchronized in phase. In various embodiments, a time of day phase transfer is implemented to transfer the TOD counter from one node or communication device to another node or communication device. In some embodiments, this transfer is performed over a single optical fiber that links a first node and a second node, for example. In some embodiments, this is implemented using a synchronization protocol in conjunction with the DSP channel to transfer synchronization information from one node to another.

Various embodiments use a DSP back-channel, auxiliary channel, out of band channel (which may be used interchangeably in some embodiments) or other communication channels to synchronize nodes and/or components thereof. In many embodiments, a DSP multiframe message is transmitted using a back or auxiliary channel that avoids the primary communication channel. In some embodiments, the DSP multi-frame message exhibits a deterministic and/or measurable latency such as a transmission latency that may be used as a known quantity to further improve synchronizing a first clock of a first node and a second clock of a second node.

Network Clock Synchronization

In some embodiments, as part of a network clock synchronization protocol, or another synchronization protocol, a selected master node with a known true time propagates its clock to a secondary node or a plurality of secondary nodes. The master and secondary transmit and receive choreographed timestamped messages across the intervening network. The timestamped messages can be used to estimate the transmission delay between master and secondary as well as the secondary node clock offset. The secondary node clock is adjusted according to the offset value and thus synchronized to the master clock in various embodiments.

In some embodiments, to provide accurate synchronization, the synchronization protocol relies on an accurate knowledge of transmit and receive latencies within and between the master and secondary node. Generally, this accurate latency data is lacking because the relevant latencies include both fiber and hardware delays. Some synchronization protocols are often unsuitable because of an inability to account and anticipate such delays and others. Moreover, node to node synchronization is made more difficult in modern coherent equipment due to interstitial delays associated with hardware and firmware, including DSPs.

In many embodiments, the protocol and underlying operation steps and data structures may be configured to improve synchronization accuracy. In some embodiments, this may be achieved through the addition of correction fields (transparent clock values) wherein such additional correction fields are communicated between nodes, attempting to capture internal node delays associated with first in first out (FIFO) transformation blocks, forward error correction, or other components and operations that produce a change in the phase of the serial data stream that is being transported through the hardware components and communication channels of a given node, such as first node and/or a second node.

Unfortunately, these latencies are increasingly difficult to characterize and can be non-deterministic across power cycles. As a result, there is a need for improved synchronization protocols in modern optical networks immune to non-deterministic latencies intrinsic to network nodes employing DSP based optical modules. In various embodiments, these improved protocols may be specified by updating, combining, or modifying existing protocols such as PTP, gPTP, and others. In some embodiments, one or more of the steps and processes disclosed herein may be implemented in DSP firmware, node specific firmware, or other software/hardware instructions.

Improved Synchronization Protocol

In part, the disclosure relates to various embodiments of an improved synchronization protocol/methods of synchronizing devices or nodes at different locations such as network nodes. The devices may include electro-optical devices, DSP devices, symbol rate DSP devices, receivers, transceivers, transmitters, PIC-based devices and others. The devices may be connected by optical fiber, electrical connections, in band channels, and out of band channels. In some embodiments, the systems and methods improve synchronization of network node by addressing delays and other problems that arise from fiber latency; device/node deterministic latency; device/node jitter; and device/node non-deterministic latency.

For example, using two different fibers for transmit (TX) and receive (RX) may introduce a deterministic latency difference in various configurations. In part, some of the embodiments disclosed support high accuracy network synchronization without knowledge or measurements of this latency difference including those wherein a deterministic latency is present. A given device has a deterministic latency portion that is defined by the device configuration (e.g. number of forward error correction (FEC) iterations) and can be used to support improved network synchronization. In some embodiments, a first node and a second node are synchronized independent of whether first node and second node are transmitting or receiving data using optical transport networking or Ethernet.

Jitter may be a factor in other nodes, such as DSP-based nodes and other communication systems and devices. Various devices experience device jitter. For example, there are functions in some communication devices or components thereof that will introduce packet jitter (e.g. clock domain crossings). This jitter reduces the accuracy of network synchronization. If the devices are selected to be coherent device this improves synchronization, in part, because the packet jitter for coherent devices is typically less than about 10 ns. A given device typically has a different latency from power cycle to power cycle. This latency variation may depend on first in first out buffer levels and phase locked loop (PLL) phases that vary from power up to power up and other factors. In some embodiments, this latency is measured in hardware after every power cycle or some other sequence of power cycles such as averages or other statistical measurements thereof. With such measurements, this type of latency can be evaluated and used to further improve synchronizing such devices on a network. In some embodiments, a phase locked loop may be use to lock the phase of various counters such as ePPS counters.

In many embodiments, Time of Day (TOD) counters are implemented in the DSP of the optical module of each networked node or in other components of a given network node. Various networked nodes may be identified using different terms such as master, primary, secondary, first, second, subordinate, etc., without limitation. Among other advantages, the system, components thereof, protocol and method localize or otherwise increase the proximity of the TOD time stamp used for synchronization closer to the network line (e.g. fiber, copper wire, radio transmitter), in most embodiments, thereby reducing the impact of non-deterministic latency or delays. The closer the time stamp source for the TOD time stamp to the transmission channel the more accurate the time tracking and synchronization. The closer a time stamp source is connected relative to the network communication channel the lower the transmission noise and other losses from a larger separation difference. In some embodiments, the closer the time stamp source proximity reduces drift and other errors that may arise from a longer transmission distance further from the first contact of the node with the data signal. As a result, having the time stamp source in a node or connected to a node improves device synchronization.

In some embodiments, the improved synchronization protocol/method is based on various requirements, configurations, steps, or operations. For example, the improved protocol may include running an accurate TOD counter inside the DSP. As another example, the improved protocol may include timestamping the transmission and reception of data via a communication channel such as a DSP backchannel. These steps or operation of the protocol may be implemented in different networked devices such as networked nodes. In various embodiments, the network nodes have a separation distance that ranges from about 80 kilometers to about 6,000.

Running an Accurate TOD Counter Inside the DSP

In some embodiments, each node includes host logic and an optical module (such as a Client or Client node), including, among other components, optics and a DSP. In various embodiments, the DSP is separate from the optical modules. The host logic may be implemented through various ASICs, circuits and other components. In some embodiments, the host logic is a host card that includes a one or more counters such as a TOD counter. A host card may include one or more processors or ASICs. The DSP may include one or more counters in some embodiments.

In some embodiments, during operation of a first or master node, the TOD counter from the host logic in the master node is first transferred to the DSP of the master node, which may be in the optical module, such as PIC-based device. In various embodiments, this transfer of TOD count includes providing an embedded Pulse-Per-Second (ePPS) counter in the host logic that is phase locked to the Host TOD counter. The phase of the ePPS counter and the master host TOD are exactly or substantially in phase.

For example, each rising edge of an ePPS signal corresponds to a host TOD rising edge. The ePPS frequency is subsequently multiplied and phase locked by the DSP of the master node to provide a nanosecond counter phased locked to the ePPS. When phase locked, the DSP counter (DSP TOD) is synchronized to the host TOD. In some embodiments, the ePPS clock may be based on a frequency that can be multiplied up to the TOD clock, which is typically greater than or equal to about 1 GHz.

In various embodiments, the ePPS clock ranges from about 10 MHz to about 25 MHz. The ePPS clock is configured to operate are a frequency conducive to support LVCMOS style technology on the printed circuit boards. The TOD clock is configured to count nanoseconds in various embodiments and thus has a frequency that is greater than or equal to about 1 GHz.

In most embodiments, having a faster TOD clock is advantageous in various embodiments because it provides more accuracy. In some embodiments, for a 1 GHz clock frequency, the minimum quanta or measurement step is about 1 nS. In some embodiments, resolution of the system is about +/−1 nanosecond. In some embodiments, resolution of the system is about +/−2 nanosecond. In other embodiments, the multiplication of ePPs is not needed and the frequency adjustment is made through other operations or not needed.

Refer now to the example embodiment of FIG. 1. A schematic of a network node 10, such as first node or a master node (or a secondary node/second node, etc.), is shown in FIG. 1. In some embodiments, the network node includes at least host card 100 including host logic and an optical module 140. The host card includes TOD counter 120 synchronized to an external, known true, clock. An embedded Pulse Per Second (ePPS) signal source/generator/counter 110 is synchronized in phase with host TOD counter 120. For example, the ePPS has a 10 MHz frequency in phase with the TOD counter 120 running at 1 GHz. In some embodiments, the host ePPS communicates, via a communications channel 131, a 10 MHz signal to a TOD counter 160 within a DSP 150 and integral to the optics module 140.

In some embodiments, the DSP TOD counter 160 is implemented by multiplying the 10 MHz ePPS signal. In some embodiments, the DSP TOD counter 160 provides at least nanosecond resolution (1 GHz). A phase lock routine is implemented to synchronize the phase of ePPS signal with the DSP TOD counter 160. Consequently, the DSP nanosecond TOD counter is synchronized in frequency and phase with host TOD 120. The DSP TOD 160 can be distributed to network nodes via network line 170, which may be an optical fiber channel or other channel. Refer now to the example embodiment of FIG. 2. A master node 10 is networked to a secondary node 20 via network lines 170 and 171. Prior to discussing the synchronization of the first node 10 with the second node, the two nodes 10, 20 in FIG. 2, it is useful to revisits some of the steps performed as part of the operation of a first node or a master node 10.

Figure 3A:
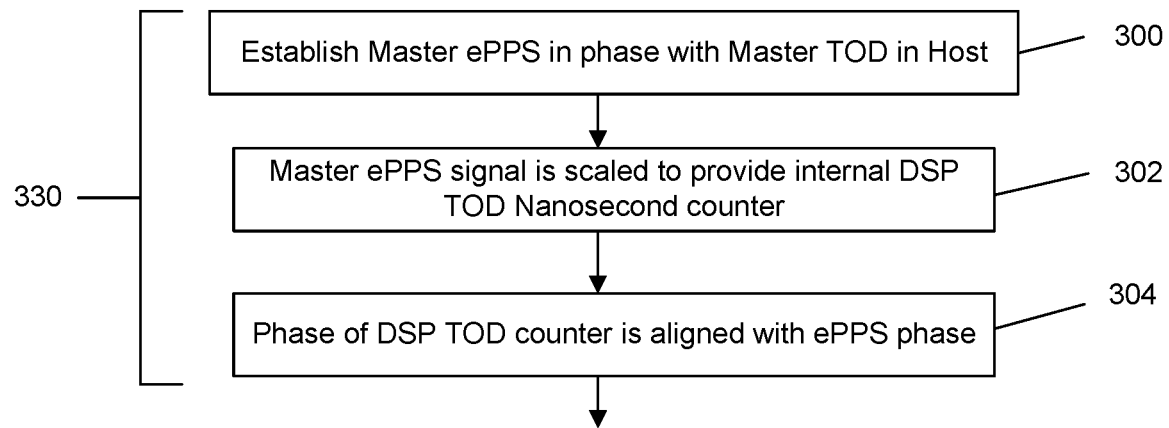
FIGS. 3A, 3B, and 3C are diagrams of different exemplary process flows or stages of TOD synchronization method or system components that use a DSP back-channel or auxiliary channel according to an exemplary embodiment of the disclosure.
Figure 3B:
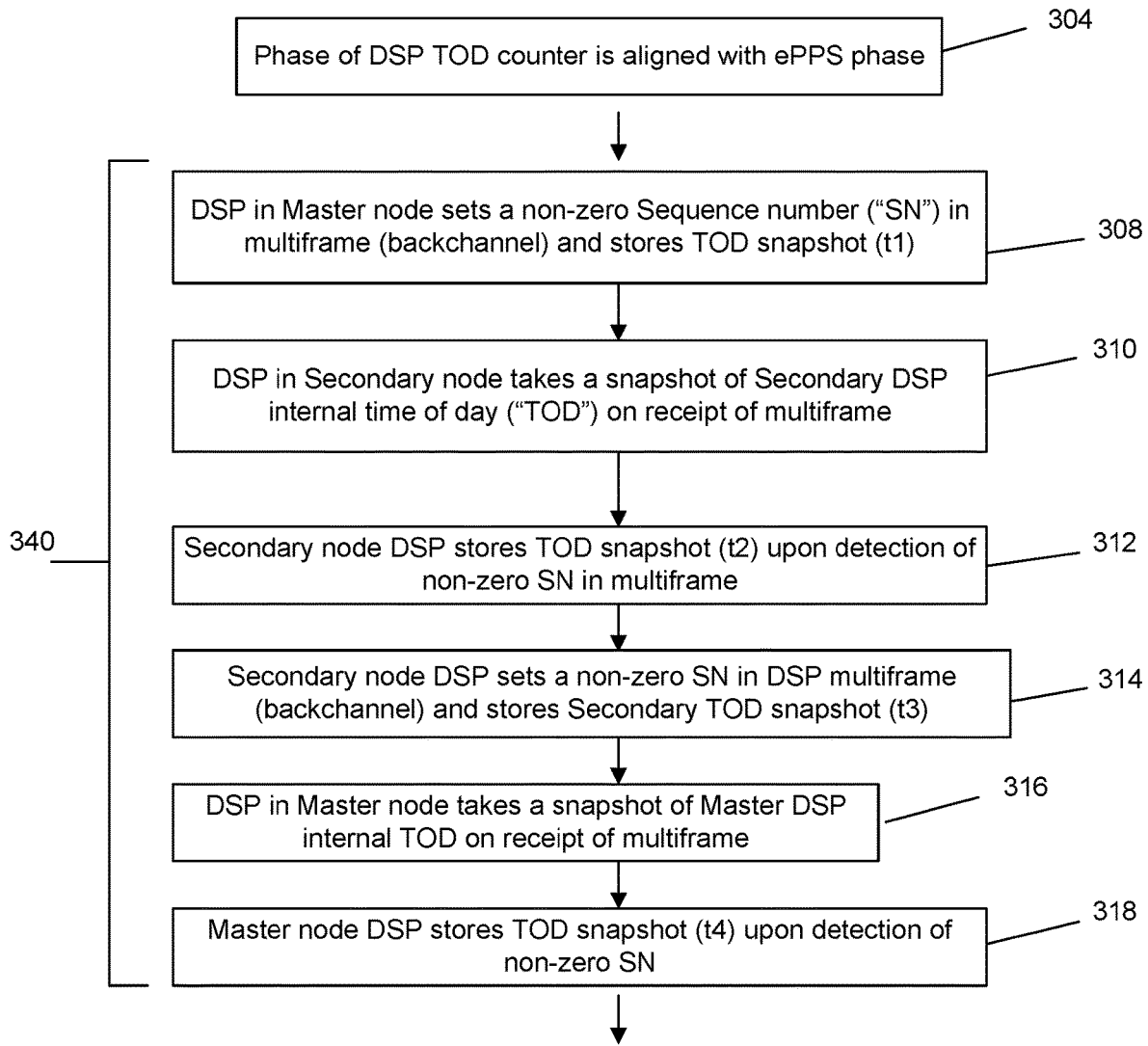
Figure 3C:
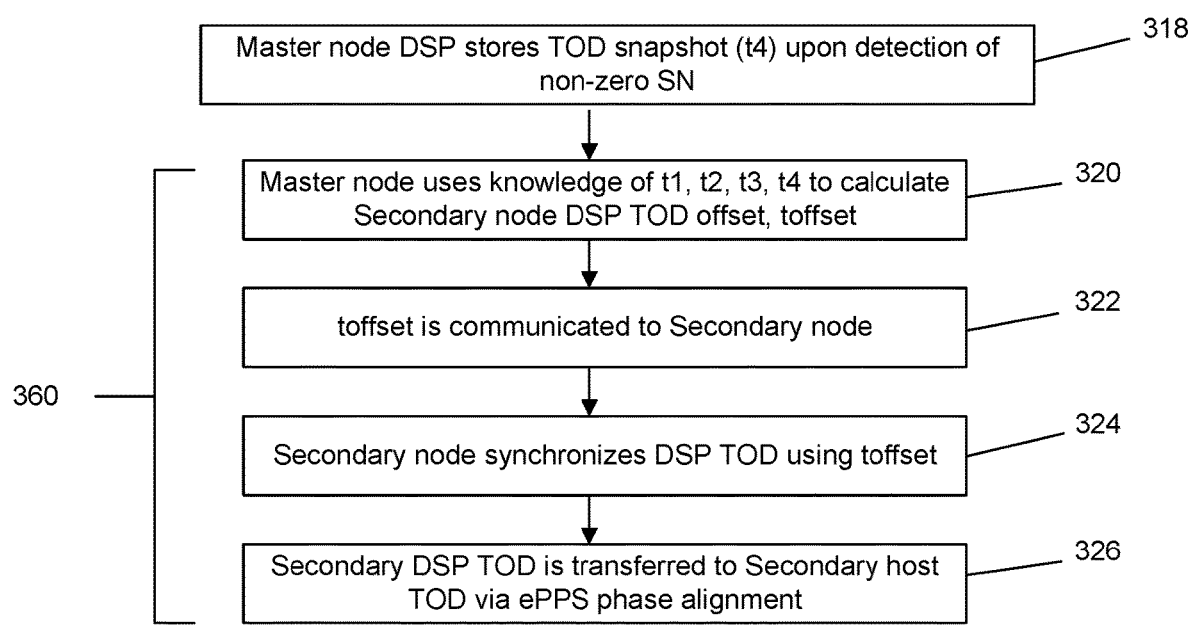

Refer now to the example embodiment of FIGS. 3A, 3B, and 3C. FIGS. 3A, 3B, and 3C are diagrams of different portions of TOD synchronization method that uses a DSP back-channel according to an exemplary embodiment of the disclosure. In some embodiments, some or all of the steps or shown in FIGS. 3A, 3B, and 3C are performed in order. In other embodiments, various of the steps and stages in FIGS. 3A, 3B, and 3C may be omitted or reordered. In some embodiments, the different groups of steps 330, 340, and 360 may be performed sequentially all steps being followed or only some of the steps.

The exemplary steps associated with group 330 in FIG. 3A summarize an exemplary method for running a TOD counter within a DSP synchronized with a host master clock and/or time of day counter. The steps of such an exemplary method embodiment may include establishing an ePPS signal in phase with master host TOD 300. In some embodiments, the steps also include communicating the ePPS signal to a TOD counter internal to the DSP 302. In some embodiments, the EPPS signal is scaled such as through multiplication or another operation to improve resolution to provide a sufficient resolved DSP TOD counter. In some embodiments, the scaled ePPS signal corresponds to an about 1 GHz counter. The method may also include, in some embodiments, aligning the phase of the DSP TOD counter with the ePPS signal 304. In some embodiments, the DSP is a coherent DSP.

Network Components

Figure 2:
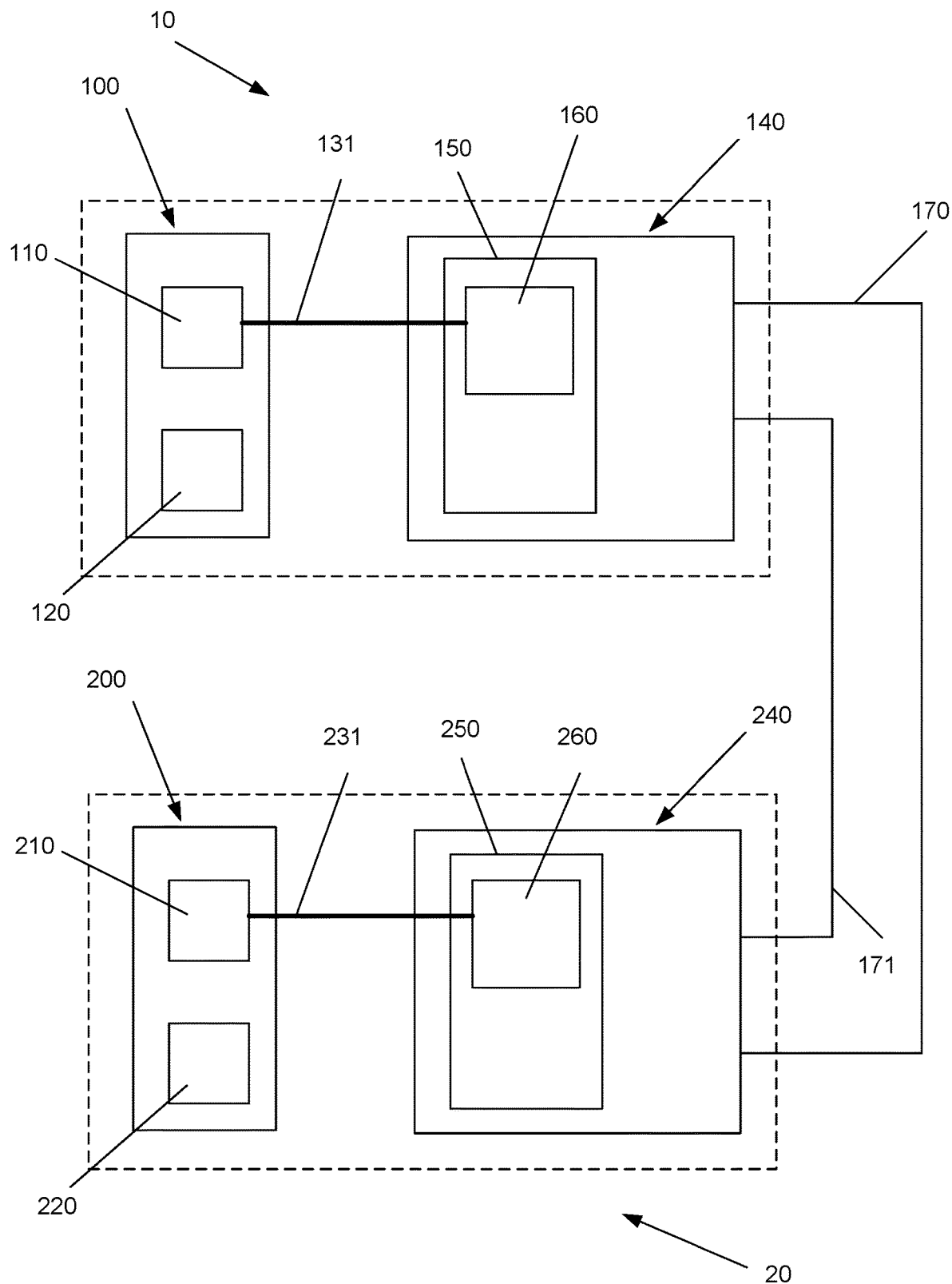
FIG. 2 is a schematic diagram of a network configured to implement TOD synchronization that includes a master or primary node and secondary node according to an exemplary embodiment of the disclosure.

Referring again to the system embodiment in FIG. 2. A master node 10 is networked to a secondary node 20 via network communication channels 170 and 171. In various embodiments, the network communication channels are optical fiber configured for transmitting and receiving high bandwidth signals multiplexed according to various multiplexing schemes. In many embodiments, line 170 transmits from the master node to the secondary node and line 171 transmits from the secondary node to the master node. However, these network lines can be bi-directional. For example, in many embodiments, data is transmitted between secondary and master by a single line, 170, and line 171 is not used.

Like the master node, the secondary node includes a DSP 250 within an optics module 240. The secondary DSP implements an internal DSP TOD counter 260. In some embodiments, this counter is in communication with a secondary host ePPS source/generator/counter 210 via communication channel 231 and can be phase locked to DSP TOD 260. Similarly, the secondary host card 200 is capable of phase locking the host TOD counter 220 with the secondary ePPS 210.

Timestamping the Transmission and Reception of Data Via the DSP Back-Channel

In some embodiments, during operation the TOD counter from the DSP in the master node is transferred to the DSP in a secondary node or nodes. In some embodiments, this transfer includes a sequence of timestamps choreographed via a DSP back-channel messaging scheme. The timestamps define transmit and receive times (e.g. t1, t2, t3, and t4) associated with messaging between master node and secondary node and are used as part of time corrective calculations similar to PTP implementations described in IEEE 1588. The TOD counter in the secondary node's DSP is synchronized via these calculations with the master DSP TOD. In various embodiments, the back-channel is a communications channel that sends one message between a transmitter (TX) and a receiver (RX) using bytes in the DSP frame overhead.

Referring briefly to FIG. 2, the master node 10 transmits and receives timestamped messages with a secondary node 20 via network lines 170 and 171. In many embodiments, a back-channel in a DSP multiframe message is used to signal the storage of relevant timestamps. The DSP multiframe message is a data message composed of a plurality of DSP frames of a predetermined size. In some embodiments, this message is 1368 bits of data including 42 (32 bit) words and a 24 bit cyclic redundancy check value (CRC). In some embodiments, the first 32 bit word is a status word that includes a sequence of previously unallocated 7 bits. Various message of different bit lengths may be used without limitation. The use of a 7 bit filed is an exemplary implementation and other data storage, tracking, and processing methods, architectures, and devices may be used.

Figure 4:
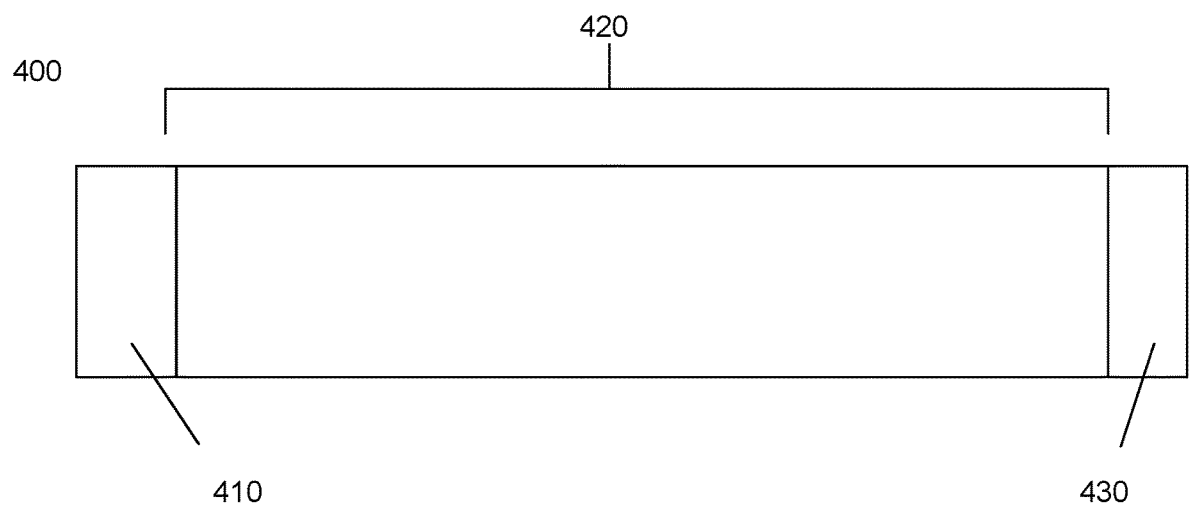
FIG. 4 is a block diagram of a DSP back-channel our out of band message structure for synchronization first and second network nodes according to an exemplary embodiment of the disclosure.

FIG. 4 depicts an exemplary embodiment of a DSP back-channel message structure 400 including, for example a status word 410, a portion allocated to data payload 420, for example hardware and software interface data, and a portion allocated for error-checking code, 430. (e.g. a Cyclic Redundancy Check (CRC) code.) The arrangement of the components of message 420 may be reordered and combined in some embodiments. In many embodiments, 7 bits are used to hold a 7 bit Sequence Number (SN). Other bit sequences of varying lengths from 1 to 20 bits may be used. Other bit counts and SN of varying lengths may be used in different implementations. The status word includes at least 7 unused bits. These spare 7-bits can be used to signify that a TOD timestamping mechanism has been requested. The 7-bit field is one implementation. In various embodiments one or more frames may include a DSP message structure that includes a status word signal, wherein one or more status word signals is configured to trigger storage of a time stamp at the second node or first node.

Other bit fields and mechanism may be used to perform the functionality associated with the 7-bit field described as an example herein. In part, the disclosure emphasizes the use of a communications channel that can send a message where the time of when the message is sent and received can be accurately detected such as at the nanosecond time scale. Some messages may be used with a timing count that has units of seconds or nanoseconds.

For example, when these 7-bits are set to a non-zero value (e.g. a non-zero sequence number), this indicates that the receiving node should store a TOD timestamp for TOD synchronization. In some embodiments, the receiving node saves a snapshot or other processable data storage entry when receiving a DSP frame but only "stores" it for TOD sync when the 7 bits (sequence number) or a sequence number of another length is non-zero. In various embodiments, the sequence number serves as an additional mechanism for error checking. For example, in some embodiments, if the sequence number does not increment by one, then there is an error somewhere in the system. In some embodiments, a given DSP back-channel message includes one or more error checking or diagnostic bits, bit sequences, or other components.

In various embodiments, one advantage of the disclosure is that the DSP multiframe message may be transmitted with deterministic and/or measurable latency. This has various benefits. For example, it is not susceptible to variations in latency due to power cycles. In various embodiments, a significant advantage arises from processing the DSP multiframe by hardware that positioned at a location that is close to an optical fiber interface. In some embodiments, the positioning of system, subsystem, hardware, or device(s) suitable for processing the DSP multiframe is implemented as close to the optical fiber interface as possible. In many embodiments, one or more processors or logic circuitry may be used in close proximity to the optical fiber to process the DSP multiframe data.

In addition, the closer in proximity the processing logical of the DSP multiframe occurs relative to the optical fiber interface, the less logical circuitry, hardware, etc. may be used, such as less complex logical circuitry, gates, ASICS, FPGA,'s etc. that would be needed if there was a greater separation distance and more noise/delays to process. In turn, by reducing the amount and/or complexity of the processing logic circuitry/hardware to process the DSP multiframe, a reduction in latency variation may also be achieved, which in turn improve systems performance. In many embodiments, by positioning any processing logic/ hardware suitable for handling the DSP multiframe as close to the optical fiber interface as possible, the requirements for FIFOs and gearboxes which introduce opportunities for unwanted latency variation are also advantageously reduced.

Returning to some of the exemplary processing stages or steps, the grouping 340 in FIG. 3B, summarizes a preferred sequence of steps for communicating TOD synchronization between a master node and a secondary node according to the present disclosure. In some embodiments, a snapshot (t1) of the master DSP TOD counter is collected at the beginning of a DSP multiframe transmission. A non-zero sequence number is inserted in the status word. This is operation 308 of FIG. 3B. In the subsequent operation 310, the DSP multiframe is received by the secondary node DSP, and a snapshot of the secondary DSP TOD counter is stored. Operation 312 checks the status word. If there is a non-zero sequence number, this TOD snapshot (t2) is saved for later synchronization calculations. In some embodiments, a given method may include transmitting a first DSP message from the first DSP to the second DSP via a communication channel, wherein the first DSP message includes a non-zero status value.

Still referring to FIG. 3B, in various embodiments, the secondary node DSP responds to the synchronization message initiated by the master node. In operation 314, the secondary node DSP sets a non-zero sequence number in a DSP status word and stores a snapshot of the secondary node DSP TOD counter (t3). When the master node DSP receives the DSP message from the secondary node, a snapshot of the master DSP TOD counter is acquired. This is operation 316 in FIG. 3B. In the subsequent operation, 318, the master node DSP checks the received status word and if it is an appropriate non-zero sequence number, the snapshot is stored (t4). Thus, the operations of group 340 in FIG. 4, produce stored or recorded values for t1, t2, t3, and t4.

The DSP TOD counter of the secondary node is synchronized and transfers time to the secondary host TOD in various embodiments. Using timestamps t1, t2, t3, and t4, node synchronization is completed in the steps of group 360 in FIG. 3C. In many embodiments, in operation 320, the secondary node clock offset is calculated according to the timestamps and appropriate application of equations (1) and (2) below. The mean time delay between nodes is calculated as $$\text{mean time delay} = [(t2-t1)+(t4-t3)]/2 \quad (1)$$

Using the mean time delay, the secondary node clock offset can be calculated as $$\text{secondary node clock offset} = t2-t1-\text{mean time delay} \quad (2)$$

In some embodiments, the value of secondary node clock offset is transmitted to the secondary node DSP and the secondary node DSP TOD counter is adjust or corrected using this value, completing operations 322 and 324 respectively. As a result of the adjustment or correction of the DSP counter, the clocks of the two nodes are synchronized. In some embodiments, the method may includes calculating a correction value for the second DSP TOD using t1, t2, t3, and t4; communicating the correction value to the second DSP TOD; and communicating a second DSP TOD phase to the second host TOD counter.

With respect to equations (1) and (2) above, in various embodiments: t1 includes the delay of the transmitter from Node 1; t2 includes the delay of the receiver in Node 2; t3 includes the delay of the transmitter in Node 2; and t4 includes the delay of the receiver in Node 1. In various embodiments, the delay of the transmitter in Node 1 and Node 2 may be treated as equal. Similarly, in various embodiments, the delay of the receiver in Node 1 and Node 2 may be treated as equal. In many embodiments, the foregoing relationships are enhanced is Node 1 and Node 2 are provided by the same vendor/manufacture. Further, in various, embodiments, nodes 1 and 2 have substantially the same latency from one turn up to the next turn up of a given transmitter, receiver, transceiver, etc. In many embodiments, the transmitter and receiver are synchronized and/or various delays are managed such that the delay on both ends is the same. In turn, this condition increases the accuracy when calculating the mean time delay using $[(t2-t1)+(t4-t3)]/2$. In most embodiments, the delay of transmitter and receiver effectively cancel out, which avoids trying to determine a specific delay value for each node. In various embodiments, the delays for one or more optical fiber paths, such as those used for the DSP frames (out of band) and the main data channel (in band0 may have different lengths/delays, but those may be measured and/or calculated during install and configuration and periodically checked over time.

In various embodiments, for TOD synchronization there are typically two synchronization types that may form part of the overall TOD synchronization. The two synchronization types are typically frequency synchronization and phase synchronization. In various embodiments, the disclosure is focused on addressing phase synchronization. The performance of phase synchronization may result in a second node obtaining substantially the same or exactly the same count/timing value of the counter/clock that is in use in the first node. In various embodiments, the count/timing values may be in seconds, nanoseconds, or other units of time. In some embodiments, the phase of the 1 GHz clocks, which count nanoseconds, can still be arbitrary, between the first node and the second nodes which results in a minimum of +/−1 nanoseconds of accuracy.

Referring again to FIG. 2, the secondary node DSP TOD counter 260 is transferred to the secondary node's host TOD 220 within the secondary host card logic. In operation 326, the synchronized secondary node DSP TOD counter is transferred to the secondary host TOD by communicating the appropriate TOD counter phase to the secondary host ePPS counter. The secondary host TOD counter is phase locked to the ePPS counter using a PLL or other devices, circuits, or processes.

In various embodiments, different configurations and parameters may be set for implementing node synchronization. TOD node synchronization among network nodes may be done periodically. In many embodiments, the synchronization update rate is host controllable. In some embodiments, the master TOD is selected among a plurality of node counters based on a best master clock algorithm (BMCA). In some embodiments, the reference TOD counter is a Client Recovered Clock. In many embodiments, the reference TOD counter is the PCIE clock. In some embodiments, the reference TOD counter is the Client Recovered Clock and the PCIE clock. In some embodiments, the DSP back-channel messaging and other devices and methods disclosed herein are used because an exact latency through either the DSP transmitter or receiver is difficult and/or impractical.

In some embodiments, the disclosure relates to providing a data path via DSP back-channel with non-deterministic delay. In various embodiments, the disclosure relates to providing a data path via DSP back-channel with deterministic delay repeatable across power cycles. In some embodiments, the method includes implementing a synchronization protocol via timestamped messaging using a DSP back-channel that connects a first and second DSP.

Exemplary Messaging and Time Stamp Features

A first DSP message is prepared by the first DSP wherein the first DSP message includes a status word. The first DSP message is communicated from the first coherent DSP to the second coherent DSP. Substantially simultaneous with the transmission of the first DSP, a first timestamp of the first DSP TOD is stored (t1). The first DSP message is received by the second coherent DSP. An appropriate value of the received status word, such as a predetermined identifier value, signals the storage of a timestamp. In this case, substantially simultaneous with the reception of the first DSP message, a timestamp of the second DSP TOD is stored (t2). A second DSP message is prepared by the second DSP wherein the second DSP message includes a status word. The second DSP message is communicated from the second coherent DSP to the first coherent DSP.

In many embodiments, in the second node, the host card or other component provides the ePPS pulse to the DSP in the same fashion as the host in the first node. In some embodiments, the disclosure may use various time stamps and time stamp values. In some embodiments, a given may include calculating a phase offset between the first DSP TOD counter and the second DSP TOD counter using a plurality of timestamp values.

The second node's host card or other component communicates a phase value to the DSP to assess if the phase value being used by the second node is correct. In turn, in some embodiments, the DSP of the second node communicates a phase difference value to host card or other component of the second node. With that phase difference value, the host card or other component of the second node uses the difference to update the phase value of the second node. In many embodiments, on the next ePPS pulse, the phase difference will be or should be zero or substantially zero after the phase updating/synchronization has been performed.

Substantially simultaneous with the transmission of the second DSP, a timestamp of the second DSP TOD is stored (t3). The second DSP message is received by the first coherent DSP. An appropriate value of the received status word signals the storage of a timestamp. In this case, substantially simultaneous with the reception of the second DSP message, a timestamp of the first DSP TOD is stored (t4). The timestamps t1, t2, t3, t4 are used to calculate a phase offset between the first and second DSP TOD counters. The offset is used to synchronize the phase of the first and second DSP TOD counters. The phase of the synchronized DSP TOD counter of the second DSP is communicated to the second host DSP TOD.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, cards, network interfaces, counters, frames, communication modules, photonic integrated circuits, timers, layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP), PIC, optical components, electronic devices, and combinations thereof. In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed:

1. A network node synchronization system comprising:
a first node comprising
a first host card comprising a first host time of day (TOD) counter and a first embedded Pulse Per Second (ePPS) counter,
a first digital signal processor (DSP) comprising a first DSP counter, wherein the first DSP is a coherent DSP; and
a first optical communication device comprising a first DSP communication channel, wherein the first DSP communication channel transports DSP frames, wherein the first ePPS counter is in communication with both the first host TOD counter and the first DSP counter, wherein a phase of the first ePPS counter is locked with a phase of the first DSP counter using a phase locked loop (PLL).

2. The network node synchronization system of claim 1, wherein the first DSP is a coherent DSP.

3. The network node synchronization system of claim 1, wherein the first DSP counter is synchronized to the first TOD counter in the first node.

4. The network node synchronization system of claim 1 further comprising
a second node comprising
a second host card comprising a second TOD counter,
a second DSP comprising a second DSP counter; and
a second optical communication device comprising a second DSP communication channel, wherein the second DSP communication channel transports DSP frames to or from the first DSP communication channel.

5. The network node synchronization system of claim 4, wherein one or more DSP frames are configured to synchronize the second node with the first node.

6. The network node synchronization system of claim 5, wherein one or more deterministic delays are used to synchronize the second node with the first node.

7. The network node synchronization system of claim 1, wherein the first DSP communication channel is in communication with a second DSP communication channel using one or more network lines, the one or more network lines providing communication between the first DSP and a second DSP, wherein the one or more network lines are an out of band network line.

8. The network node synchronization system of claim 5, wherein the first node and the second node are synchronized independent of whether the first node and the second node are transmitting or receiving data using optical transport networking or Ethernet.

9. The network node synchronization system of claim 5, wherein the one or more DSP frames comprise a DSP message structure comprising a status word signal, wherein the status word signal is configured to trigger storage of a time stamp at the second node or the first node.

10. A method to synchronize a first network node and a second network node, the method comprising:
providing the first network node comprising a first host TOD counter in communication with a first coherent DSP in the first network node running a first DSP TOD counter;
providing the second network node comprising a second host TOD counter in communication with a second coherent DSP in the second node running a second network DSP TOD counter;
synchronizing the first DSP TOD counter with the first host TOD counter; and transmitting a first DSP message from the first coherent DSP to the second coherent DSP via a communication channel, wherein the first DSP message comprises a non-zero status value, wherein synchronizing the first DSP TOD counter with the first host TOD counter further comprises:
providing a first embedded Pulse Per Second (ePPS) counter in the first network node in communication with both the first host TOD counter and the first DSP TOD counter; and
locking a phase of the first ePPS counter with a phase of the first DSP TOD counter using a phase lock loop (PLL).

11. The method of claim 10 further comprising
storing a snapshot (t1) of the first DSP TOD counter substantially simultaneous with transmitting the first DSP message;
detecting, at the second coherent DSP, the non-zero status value in the first DSP message;
storing a snapshot (t2) of the second DSP TOD counter substantially simultaneous with receiving the first DSP message; and
transmitting a second DSP message from the second coherent DSP to the first coherent DSP via the communication channel, wherein the second DSP message comprises another non-zero status value.

12. The method of claim 11 further comprising
storing a snapshot (t3) of the first DSP TOD counter substantially simultaneous with transmitting the second DSP message;
detecting, at the first coherent DSP, the non-zero status value in the second DSP message; and
storing a snapshot (t4) of the first DSP TOD counter substantially simultaneous with receiving the second DSP message.

13. The method of claim 12 further comprising
calculating a correction value for the second DSP TOD counter using t1, t2, t3, and t4;
communicating the correction value to the second DSP TOD counter; and
communicating a second DSP TOD phase to the second host TOD counter.

14. A method to synchronize
a first network node and a second network node, the method comprising:
providing the first network node comprising a first host TOD counter in communication with a first coherent DSP in the first network node running a first DSP TOD counter;
providing the second network node comprising a second host TOD counter in communication with a second coherent DSP in the second network node running a second DSP TOD counter;
synchronizing the first DSP TOD counter with the first host TOD counter;
transmitting a first DSP message from the first coherent DSP to the second coherent DSP via a communication channel, wherein the first DSP message comprises a non-zero status value;
providing a second embedded Pulse Per Second (ePPS) counter in the second network node in communication with both the second host TOD counter and the second DSP TOD counter;
locking a phase of the second ePPS counter with a phase of the second DSP TOD counter; and locking the phase of the second host TOD counter with the phase of the second ePPS counter.

15. The method of claim 10 further comprising calculating a phase offset between the first DSP TOD counter and the second DSP TOD counter using a plurality of timestamp values.

16. The method of claim 15 further comprising synchronizing the phase of the first DSP TOD counter and the second DSP TOD counter using the phase offset.

17. The method of claim 16 further comprising communicating the phase of the synchronized second DSP TOD counter to the second host TOD counter.

18. The method of claim 10 further comprising transferring a timing count from the first network node to the second network node using one or more time-stamped messages transmitting using the communication channel.

19. The method of claim 18 wherein the timing count has units of seconds or nanoseconds.

* * * * *